April 26, 1927.
C. C. WRIGHT
1,626,128
FLUSH TANK CONSTRUCTION AND VALVE LEVER OPERATING MECHANISM THEREFOR
Filed July 23, 1925
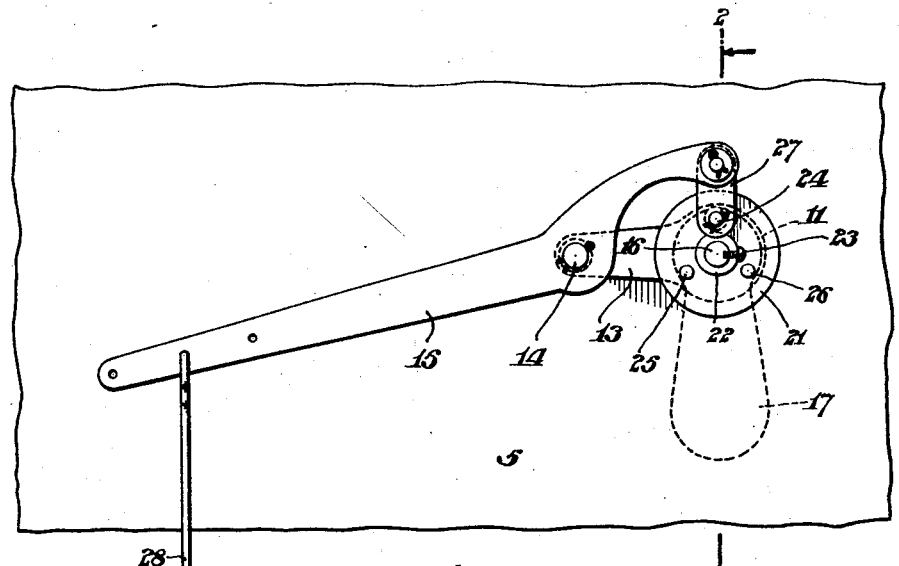
Fig. 1.
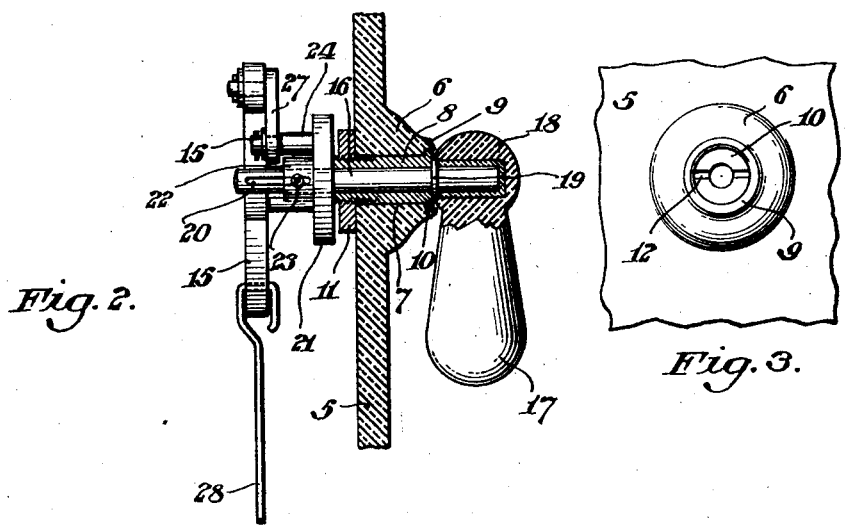
Fig. 2.
Fig. 3.
Inventor:
Charles C. Wright,
By
Attorney.

Patented Apr. 26, 1927.

1,626,128

UNITED STATES PATENT OFFICE.

CHARLES C. WRIGHT, OF CAMDEN, NEW JERSEY, ASSIGNOR OF ONE-HALF TO CAMDEN POTTERY COMPANY, A CORPORATION OF NEW JERSEY.

FLUSH-TANK CONSTRUCTION AND VALVE-LEVER-OPERATING MECHANISM THEREFOR.

Application filed July 23, 1925. Serial No. 45,568.

The invention relates to flush tank construction and valve lever operating mechanish therefor. The object is to provide an improved tank construction, and improved means for mounting the valve lever actuating mechanism. The invention is especially applicable to tanks made of vitreous china or the like.

The invention comprises a boss formation integral with and projecting from the main surface of the tank, in order to provide ample bearing for the bushing, forming the bearing for the actuating spindle, and, at the same time, forming a spacing body for maintaining the spindle operating handle sufficiently spaced from the surface of the tank.

The boss, which has a formation in the nature of a stationary escutcheon, has a countersunk portion surrounding the channel for receiving the bushing, and the bushing is provided with a flange seated in said countersunk portion. This flange is adapted to engage a cooperating flange on the spindle, which is seated in the bushing, and the free end of which is secured into the vitreous operating handle, so that metallic bearing surfaces are provided between the spindle and its bushing with respect to relative longitudinal movement, in order to prevent frictional contact between the vitreous handle and the vitreous boss.

The invention also comprises improvements in the general actuating mechanism.

Referring to the drawings, which illustrate merely by way of example a suitable embodiment of my invention:—

Fig. 1 is an elevation inside the tank.

Fig. 2 is a vertical section on line 2, 2 of Fig. 1.

Fig. 3 is an elevation outside the tank with the spindle and handle removed.

Similar numerals refer to similar parts throughout the several views.

The wall 5 of the vitreous flush tank, is provided on its outer face with the symmetrical boss 6, integral with said wall. Through the central part of this boss is provided a channel 7, extending entirely through the wall of the tank, for receiving the bushing 8. This gives a body for supporting the bushing more than twice the thickness of the normal wall thickness, and thus adds greatly to the stability of the structure. This boss is also provided, in its outer face, with countersunk portion 9, surrounding said channel, and adapted to receive the flange 10 of the metallic bushing 8. The bushing 8 is threaded at its inner end for threading into the plate 11, so that the boss and adjacent wall portion are clamped securely between the flange 10 and plate 11. The flange portion 10 of the bushing 8 is provided in its face with the slot 12 for receiving the end of a screw driver or similar tool. The plate 11 is provided with the horizontal extension 13 carrying, at its outer end, the post 14, forming the fulcrum of the flush valve actuating lever 15, mounted thereon. The spindle 16, which extends through bushing 8, is secured at its outer end, into the handle 17, of vitreous china or similar material. A suitable cementing material, as at 18, is used to secure the spindle end into said handle. Spindle 16 is provided with a flange 19, at a point between its two ends, at the margin of the handle, as shown in Fig. 2, and forms a closure for the body of cement 18, which surrounds the spindle end within the handle 17. This flange 19 also forms a bearing, as to longitudinal movement, against the face of the flange 10. The opposite end of spindle 16 is provided with a groove 20. Upon the grooved end of spindle 16 is adjustably mounted the disc member 21, having the hub 22 carrying the set screw 23, which cooperates with the groove 20 for locking the disc 21 in desired position of longitudinal adjustment upon the spindle 16. From the outer face of the disc 21 project the pins, or studs 24, 25 and 26. These pins are symmetrically arranged. The upper pin is preferably on the vertical line passing through the spindle 16. The pins 25 and 26 are on a horizontal line and evenly spaced from said vertical line. The upper pin is preferably longer than the other two, and is connected, by a link member 27, to the free end of lever 15, as shown in Fig. 1.

It will be noted that in assembling the device, the plate 11 is held firmly against the wall 5 of the tank, with the arm 13 extending horizontally. While in this position, the bushing 8 is threaded tightly into the plate 11, thus securing it in absolutely fixed position.

In operation: With the parts thus positioned, it will be seen that, by moving the handle 17 either to the right or to the left, the pin 24, operating through link 27 will pull down the right hand end of lever 15 and will consequently elevate the left hand end of said lever to actuate, through the connecting rod 28, the flush valve, not shown. It will be also understood that the lever actuation will be substantially the same with the movement of handle 17 either to the right or to the left. The pins 25 and 26 are adapted to encounter the link 27, to limit said handle actuating movement in either direction.

It will also be noted that a substantial advantage is gained by increasing, much beyond the normal practice, the thickness of the wall in which the bushing 8 is seated. This provides a much longer and more stable bearing for the spindle 16, and also greatly reduces the strain upon the vitreous wall of the tank. It will be noted, from an inspection of Fig. 2, that the metallic flange 19 projects slightly beyond the surface of the vitreous handle 17, and that the flange 10 occupies a countersunk portion of boss 6, arranged so that the rounded portion of handle 17 and the flange 19 project slightly into said countersunk portion of the boss 6. This makes a compact and attractive assembly of the handle and boss. At the same time it will be noted that the parts are so arranged and proportioned that the two metallic flanges 10 and 19 come into contact, while the adjacent portions of the vitreous boss and handle are maintained slightly separated, thus preventing undesirable grinding between said vitreous members.

What I claim is:—

1. In a flush tank construction, the combination of a horizontally projecting valve-actuating spindle, of a china flush tank having a portion of its vertical wall increased in thickness, so as to provide a tapered boss formation integral with said side wall and projecting beyond the surrounding outer wall surface, said boss and wall behind the boss provided with a horizontally extending channel, a bushing forming a bearing for the spindle, secured in said channel and extending from the inner surface of the tank wall to near the outer face of the boss and having a flange on its outer end and an actuating handle secured to the outer end of the spindle in close proximity to the integral boss.

2. In a flush tank construction the combination of a horizontally projecting valve-actuating spindle, of a china flush tank having a portion of its vertical wall increased in thickness, so as to provide a tapered boss formation integral with said side wall and projecting beyond the surrounding outer wall surface, said boss and wall behind the boss provided with a horizontally extending channel, a bushing forming a bearing for the spindle, secured in said channel and extending from the inner surface of the tank wall to near the outer face of the boss, a flange on the spindle for frictional engagement with the end of the bushing, and an actuating handle secured to the spindle in close proximity to said flange.

3. In a flush tank construction, the combination of a horizontally projecting valve-actuating spindle, of a china flush tank having a portion of its vertical wall increased in thickness so as to provide a tapered boss formation integral with said side wall and projecting beyond the surrounding outer wall surface, said boss and wall behind the boss provided with a horizontally extending channel, a bushing forming a bearing for the spindle, secured in said channel and extending from the inner surface of the tank wall to near the outer face of the boss and having a flange on its outer end, a flange on the spindle for frictional engagement with the flange of the bushing, and an actuating handle secured to the end of the spindle.

CHARLES C. WRIGHT.